Jan. 2, 1968   M. A. SHERKIN   3,361,613
METHOD AND MEANS FOR MAKING A TIRE
Filed Sept. 25, 1963   3 Sheets-Sheet 1

INVENTOR
MORRIS A. SHERKIN.
BY: Fetherstonhaugh & Co.
ATTORNEYS

INVENTOR
MORRIS A. SHERKIN.
BY: Fetherstonhaugh & Co.
ATTORNEYS

Jan. 2, 1968   M. A. SHERKIN   3,361,613
METHOD AND MEANS FOR MAKING A TIRE
Filed Sept. 25, 1963   3 Sheets-Sheet 3
FIG. 3
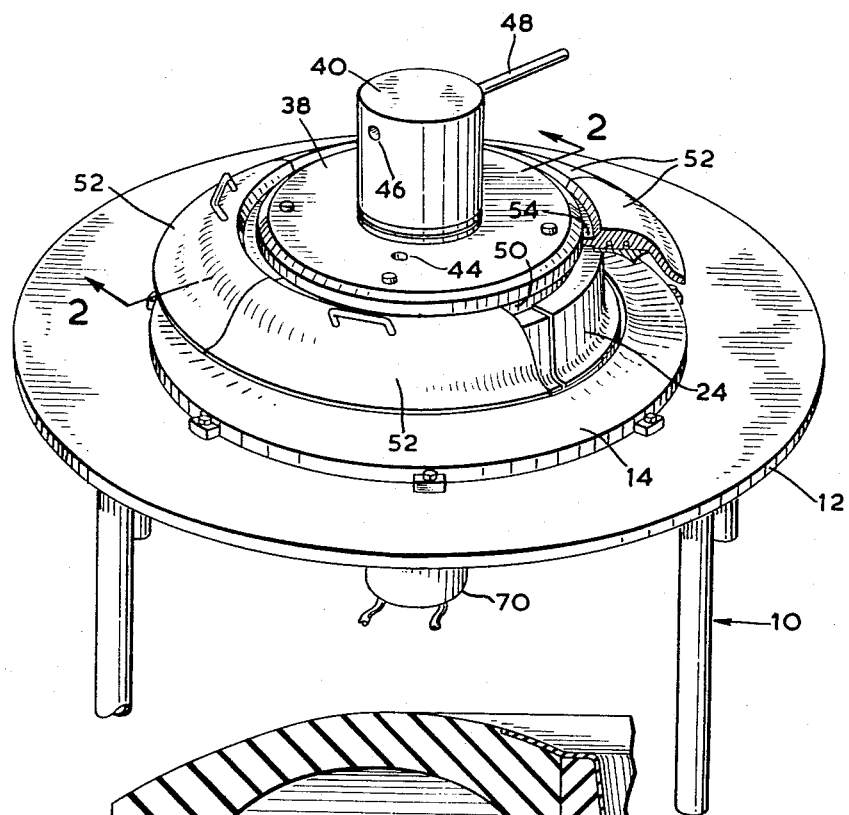
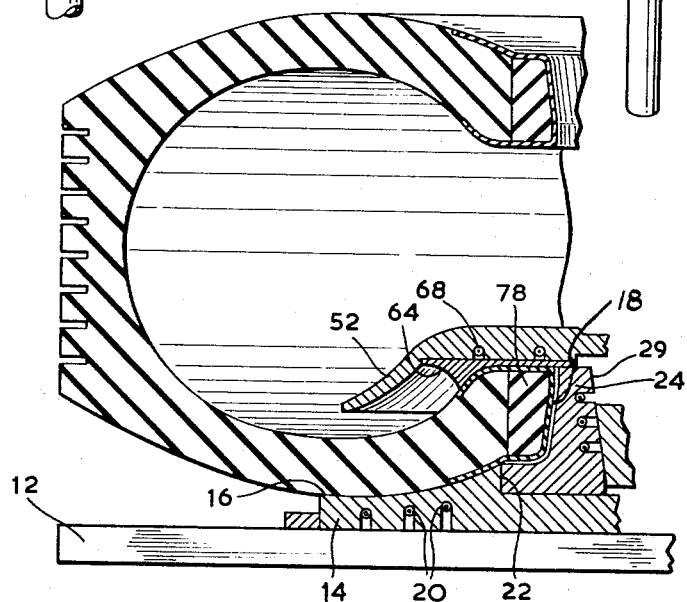
FIG. 4
INVENTOR
MORRIS A. SHERKIN.
BY: Featherstonhaugh & Co.
ATTORNEYS.

United States Patent Office 3,361,613
Patented Jan. 2, 1968

3,361,613
METHOD AND MEANS FOR MAKING A TIRE
Morris A. Sherkin, 76 Ridelle Ave.,
Toronto, Ontario, Canada
Filed Sept. 25, 1963, Ser. No. 311,552
7 Claims. (Cl. 156—500)

This invention relates to a method and means for making a tire.

For clarity herein I use the term "rim sides" to define the inner and outer surfaces of one wall of a tire adjacent the radially inward surface of the tire where they join such radially inward surface, which is referred to as the "peripheral rim surface." Thus it will be noted that each tire has two such walls, each with two "rim sides," and each such tire has two such "peripheral rim surfaces."

Heretofore, although used tires have been provided with new treads, it has not been possible to alter the internal diameter and width of the tire rim. Rim diameters and widths are standardized by the "Tire and Rim Association," and such diameters and widths must therefore conform to the Association standards.

I have devised a method and an apparatus whereby a tire of one rim diameter may be, with or without provision of a new tread, converted into a tire of lesser rim diameter, and/or differing rim thickness.

In accordance with the invention a retreaded used tire is provided on its peripheral rim surfaces with blocks and/or strips of rubber, and/or rubberized material, affixed thereto to cause a decrease in the rim diameter. (By "rubberized material" is meant fabric, cord or filament of nylon, rayon or the like, impregnated with rubber, and by "rubber containing material" is included both "rubberized" material and rubber itself.) With the correct amount of rubber and/or rubberized material so attached, to build such peripheral rim surfaces inward with the required rim thickness, heat and shaping pressure are applied to a pair of opposed rim sides and to the peripheral rim surface joining such sides, tending to shape them to the desired form. The tire and rubber and/or rubberized material are fused together by the action of the heat, and the heat and shaping pressure cause the now built up rim to assume the dimensions and form desired. The other rim is then treated in the same way.

The apparatus for decreasing the tire rim diameter comprises a shaping surface adapted to contact an outer rim side, then including the built up material adjacent the peripheral rim, and a shaping surface adapted to contact the opposed surface inner rim side and means adapted to cause said surfaces to move toward one another to clamp the tire between them. A third shaping surface is provided, designed to bear outwardly on the peripheral rim surface when the inner and outer surfaces are clamping the tire and to complete with the inner and outer surfaces the desired form for a rim of the tire. Means are provided for heating the shaping surfaces, whereby the three shaping surfaces cause the rubber and/or rubberized material in both the tire and the built up material to fuse and creep and cohere to adjacent material, and the three surfaces act as a mold to shape the rubber and/or rubberized material at and adjacent the rim to the dimensions and form desired.

In a preferred embodiment, the member forming the third shaping surface is L-shaped, the upright of the L forming the inner peripheral rim surface with the free end abutting a projection from the second shaping surfaces, while the cross-bar of the L fits in a recess in the first shaping surface to form the radially inward end of the latter, while the free end of such cross-bar abuts a surface in the member carrying such first shaping surface. Thus it will be seen that the L-shaped member forms the spacing member to control, with given first and second shaping surfaces, both the rim diameter and thickness. Thus with most tire designs the rim diameter and thickness may be altered with the same apparatus, including the first and second shaping surfaces, merely by replacement of the L-shaped member.

By the above method and with the above apparatus, tires of one rim diameter and thickness may be converted to tires of another diameter or thickness.

In drawings which illustrate a preferred embodiment of the invention:

FIGURE 3 is an outside view of the device, and

FIGURE 4 is a sectional view of FIGURE 3.

Figure 1:
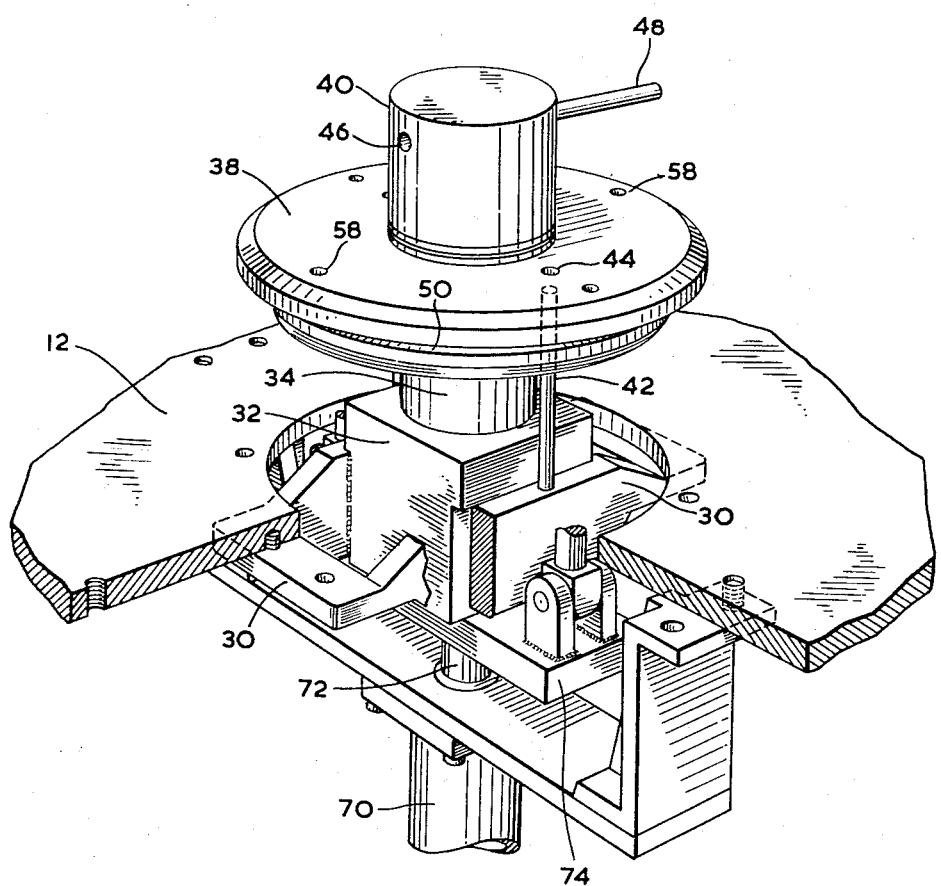
FIGURE 1 is a view showing a number of the working parts of the inventive device.
Figure 2:
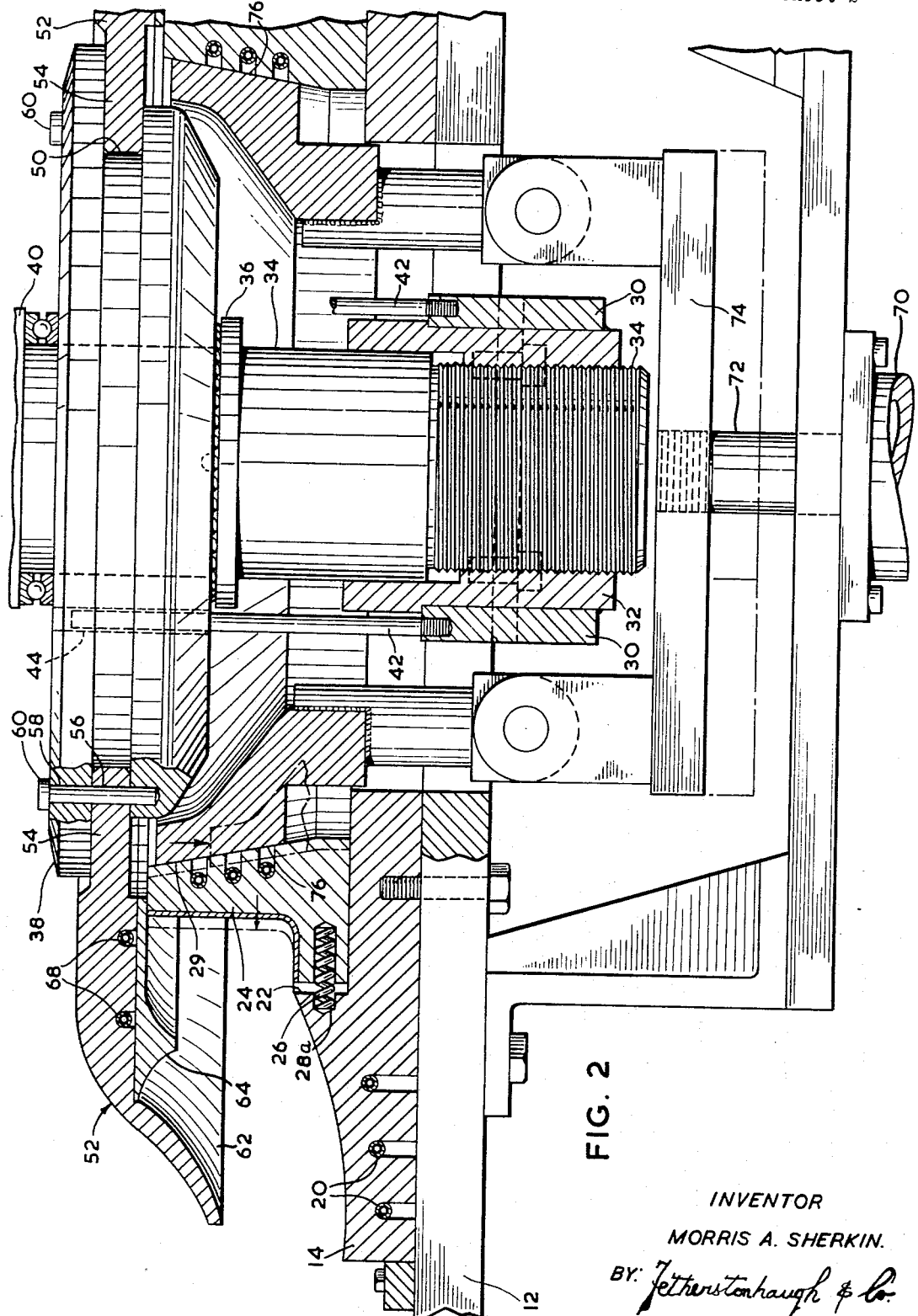
FIGURE 2 is a vertical cross-section of the device.

In the drawings a base schematically indicated as 10 in FIGURE 3 supports a plate 12 on which is mounted a shaping pressure plate 14, having an upper surface contoured to shape an outer rim side. The pressure plate 14 has its upper surface shaped to receive the outer rim side between the location near its farthest outward bulge 16 across an annular area extending radially inward of such bulge, to a radially inward location short of the intended location of the peripheral rim surface 18. In the lower surface of the plate 14 grooves are provided to receive heating wires 20 connectible to heat plate 14.

Immediately radially inward of the shaped portion of the plate 14 is an annular upwardly facing recess provided in the plate 14, defined from the shaped portion by a vertical wall 22 forming a shoulder and concentric with the shaped portion. Some distance inwardly thereof, plate 14 provides a large central aperture. Four annular sector members 24, L-shaped in vertical cross-section, are provided slidably resting in the recess in plate 14, the outer surface of each forming an arc of a circle, such arc encompassing an angle, measured at the centre of such circle of slightly less than 90° and having a curvature the same as that of the shoulder 22. The L-shaped members 24 do not, however, quite form a complete circle between them when the outer surface of each is conforming to the same circle, spaces being left between co-adjacent edges of the L-shaped members 24 so that the four members 24 may move radially inwardly away from the shoulder 22. Compression springs 26, located in sockets 28a in the shoulder and in the corresponding surface of the L-shaped members 24, bias the L-shaped members inwardly toward the axis of the concentric members. The L-shaped members 24 are provided on their radially inward sides with a bearing surface 29, sloping radially inwardly and downwardly for a purpose to be specified hereafter.

A yoke 30 is attached to the plate 12 for support thereby below plate 14, and carries a nut 32 with a vertically threaded bore concentric with the aperture in plate 14. A bolt 34 is threaded for mounting in nut 32 to extend upwardly through the aperture in plate 14. Located above plate 14 and projecting outwardly from bolt 34 is a thrust bearing 36. Mounted on bearing 36 is a mounting ring 38 for rotation with respect to said table, and the mounting is therefore preferably of the ball bearing type, as shown. The mounting ring 38 is apertured to receive the bolt 34 passing upwardly therethrough, and the upper surface of the ring 38 is provided with a ball bearing seat to receive and cooperate with a corresponding downwardly facing ball bearing seat on the head 40 of bolt 34. A ball bearing between the two seats allows the head 40 to rotate relative to the ring 38. Rods 42 extending upwardly from and connected to yoke 30 project slidably into bore 44 in ring 38 to maintain the said ring 38 against rotation. Thus it will be seen that the ring 38 is maintained in vertical location by the bolt head 40 and table 28 and is moved up and down by rotation of the bolt 34 in nut 32. Many means for rotation of the bolt are available; however, in the specific embodiment it is provided that the head 40 will be provided with one or more bores 46 to receive a torque bar 48 to rotate the head.

The outer periphery of ring 38 is provided with a rectangular groove 50 extending thereabout. Four plates 52, each of which encompasses 90° of arc, together make up an annulus and are each, over their 90° arc, provided with a radially inwardly extending tongue 54, rectangular in vertical cross-section, complementary to and for reception in the rectangular groove 50. On each side of such tongue 54 is provided with shoulders to seat against the groove-defining extensions in the ring.

When the tongue is seated in the groove, aligned bores 56 and 58 in the tongue and in the groove-defining portions of the ring respectively, allow the insertion of pins 60 to retain the sector plates 52 in place on the ring 38.

The sector plates 52 comprise two parts, an upper body member 62 carrying tongue 54 and rigidly attached to the lower surface thereof and a shaping pressure plate 64 having a lower shaping surface shaped to fit the inner rim side of a tire on the portion of such side adjacent the rim. The assembled sector plates 52, considered collectively, are concentric with the aperture in plate 14, the shaping surface, and with shoulder 22 and such sector pressure plates 52 are so arranged and constructed that a tire having the then lower of its outer rim sides adjacent the rim bearing on the lower shaped plates 14 may be clamped by the sector plates 22 projecting inside the tire on proper rotation of the bolt 34.

Between the upper surface of sector plates 64 and the lower surface of the body member 62, heating wires 68 are provided to heat the sectored pressure plates 64.

The sloping portion of sectored pressure plates 64 bears on a corresponding sloping portion of the tire and the collective effect of the pressure plates 64 is to allow accurate centering of the tire relative to the concentric members when the tire is clamped, and to provide with plate 14 the clamping action.

Also mounted on the frame, below the yoke, is a piston cylinder 70 with its axis vertical and concentric with the concentric members and having a piston rod 72. Rigidly mounted on the piston rod is a cross member 74. Rigidly supported on the cross member 74 is a cam in the form of a ring and having a radially outward surface 76, sloping outwardly and upwardly, adapted to complement surfaces 29 on the sector members. The dimensions and slope of the complementary surfaces 29 and 76 are designed so that the downward movement of the piston cam surface 76 forces the L-shaped members 24 outward against shoulders 22 where they form with the upper and lower shaping surfaces a complete mould for a rim. Under movement between such lower limit of piston movement and the upper limit thereof cam surface 76 allows progressive retraction of the L-shaped members 24 from their outer position, under the impulsion of compression springs 26.

In operation: a tire is selected whose diameter is to be reduced. Usually, this will be a tire which after manufacture has been used until it has been worn out or has no tread and has been "re-treaded" or "recapped" by conventional retreading methods. Blocks of rubber 78 are then cemented to the inner surface of the original rim and covered with rubber impregnated rayon or nylon cords which are wrapped over such chunks. Although the drawing indicates that one layer of rubber covered by one layer of cord is used, it will be understood that the diameter decreasing increment may be built up of as many layers as desired. It being understood that the rim diameter reducing increment so built up is to be fused and solidified under pressure, the excess of gross size (i.e., including temporarily existing air spaces) over the desired final size must be determined partly empirically and partly by the "packing" achieved in the preliminary assembly of the diameter reducing increment.

With the added rubber and rubberized material, the machine is readied for use by having piston rod 72 and hence cam surface 76 in the uppermost position, and sectored upper pressure plates 52 are removed. For such removal convenient handles are provided as shown.

The tire is then placed in position with one of its outer surfaces resting on the surface of pressure plate 14. It will be noted that the tire contacting surfaces of said pressure plate 14, sloped in side view, and forming a surface of revolution, will act to centre the tire relative to the concentric members.

The sectored upper pressure plate members 52 are then fitted to both rest inside the tire and with their tongues seated in grooves 50; pins 60 are then dropped into place in the aligned bores to hold plate members 52 firmly in position. At the same time if any connections are required between heating wires 76, 20 or 68 and a power source, then these connections are made so that power may be applied to such wires 76, 20 or 68 when desired. Bolt 34 is then rotated in a sense to lower sectored pressure plates 52 into position, i.e., until they clamp the tire firmly between the upper and lower pressure plates and until their downward movement is halted by the upper surfaces of L-shaped member 34, the amount of added rubber and rubberized material being so selected that when the downward movement is halted, the tire is firmly clamped. It should be noted that the sloping tire contacting surfaces of the segmented pressure plates 52 form collectively a surface of revolution and act to correct any eccentricity in location of the tire, if such eccentricity exists.

With all heating wires connected, power is applied so that the three shaping surfaces are heated to a temperature of preferably 290°–325° C. (The limits of temperature are set by the fact that the rubber or rubberized material cannot be worked at temperatures lower than about 225° F., while such rubber or rubberized material will tend to disintegrate at about 450° F. However, better results are obtained at 290°–325° F.) The piston rod 72 is then lowered, causing cam surface 76 to actuate L-shaped members 24 until they reach shoulder 22. The force causing such motion is sufficient to cause member 24 to move in spite of their frictional engagement with members 64. In this arrangement upper and lower shaping surfaces and the L-shaped member form a heated mould cavity, exerting pressure and forcing the rubber to fit the cavity and form the shape and diameter desired.

When the shaping of the reduced diameter is completed and the new rubber and/or rubberized material has adhered to the tire proper, the piston rod 72 is moved upwardly, and as a result of the consequent movement of the cam surfaces, the L-shaped shaping surfaces 24 are allowed to recede from the tire rim, allowing withdrawal of the tire from the machine after the top sector members 52 have been taken off. Once this is completed, the tire may be inverted, allowing the second rim to be treated in the machine by a reptition of the above described process.

It will be noted that the thickness of the rim is set by the length of the upright of the L-shaped member 24, while rim diameter may be controlled by the length of the cross-bar of member 24. Thus the machine may, within a wide range, be adapted from one rim diameter and/or rim thickness to another by the substitution of a differently dimensioned member 24 (having regard to the location of cam contacting surface 29); and without change in any of the other parts of the apparatus.

What I claim as my invention is:

1. Apparatus for adapting tires to reduced rim diameters, comprising: a first member shaped to conform to one rim side of such a tire adjacent the rim on said wall; a second member shaped to conform to the opposed rim side of such tire adjacent said rim; means for causing said first member to move toward said second member to exert clamping pressure thereon; a third member having a pressure applying surface adapted to exert pressure on the peripheral rim surface of a rim side of a tire held by said first and said second members, said third member being locatable inside the hole of a tire when held by said first and said second rim members as aforesaid and being actuatable to carry said pressure applying surface thereof into pressure applying contact with the peripheral rim surface of a rim of a tire held by said first and said second members, and means for heating the tire contacting surfaces of said first, second and third members.

2. Means for molding a tire rim comprising: a first member having a surface shaped to fit one rim side of a tire wall adjacent the rim, a second member having a surface shaped to fit the opposed rim side of the same tire wall adjacent the rim, a third member shaped to fit the peripheral rim surface of such tire rim, means for moving said first and second members toward one another to exert, with their shaped surfaces, clamping pressure on such tire wall; means for moving said third member outwardly to correspond to the desired location of said peripheral rim surface of a tire so clamped, said three members being designed and constructed to form together a mold for such rim, and means for heating the tire contacting surfaces of said three members.

3. Means as claimed in claim 2, wherein said third member comprises a number of sectors, each having a radially outward surface shaped to conform to the diameter of the desired peripheral rim surface of said tire, said sectors being movable from an outward position where said radially outward surfaces collectively lie on the desired rim periphery location of a tire so clamped to an inward position where said surfaces lie inward of said desired rim periphery location.

4. Means as claimed in claim 3, wherein said sectors are each biased inwardly and means are provided for moving said sectors outwardly against said bias.

5. Means as claimed in claim 3, wherein said third member sectors are each L-shaped, with the free end of the upright of said L abutting one of said shaped surfaces, and the cross-bar of said L resting in a recess in the other of said shaped surfaces with the free end of said cross-bar facing radially outwardly to abut a shoulder on the member having said other shaped surface.

6. Means as claimed in claim 4, wherein said third member sectors are each L shaped with the free end of the upright of said L abutting one of said shaped surfaces, and the cross bar of said L resting in a recess in the other of said shaped surfaces, with the free end of said cross-bar facing radially inwardly to abut a shoulder on the member having said other shaped surface.

7. A device as claimed in claim 1, wherein one of said first or second members is provided with means for centering said tire relative to said first, second and third members, said means being operable during the clamping of said said tire by said first and second members.

References Cited

UNITED STATES PATENTS

| 2,802,512 | 8/1957 | Rouse | 156—116 |
| 3,113,902 | 12/1963 | Dismuke | 156—116 X |
| 3,232,816 | 2/1966 | Fields | 156—116 X |
| 1,917,261 | 7/1933 | Hawkinson | 156—96 |
| 2,566,797 | 9/1951 | Heintz | 18—18 |
| 3,057,011 | 10/1962 | Knox | 18—42 |

EARL M. BERGERT, *Primary Examiner.*

HAROLD ANSHER, *Examiner.*